United States Patent Office 3,431,238
Patented Mar. 4, 1969

3,431,238
OXIDATION OF HALOPHENOLS
Willem Borman, Dalton, Mass., assignor to General
Electric Company, New York, N.Y., a corporation
of New York
No Drawing. Continuation-in-part of application Ser. No.
399,325, Sept. 25, 1964. This application Dec. 22, 1967,
Ser. No. 692,731
U.S. Cl. 260—47                                  8 Claims
Int. Cl. C08g 33/10, 33/00

ABSTRACT OF THE DISCLOSURE

Preparation of lightly branched polyhalophenol and polyhalophenol copolymers by reaction of a halophenol with oxygen in the presence of a basic cupric salt and an amine. The process is applicable to phenols having halogen atoms substituted in both ortho positions relative to the hydroxyl groups. The polymers formed are lightly branched and have more than 0 and up to 1 branching unit per polymer unit.

INTRODUCTION

This is a continuation-in-part of U.S. patent application Ser. No. 399,325, filed Sept. 25, 1964.

This invention relates to the preparation of lightly branched polyhalophenols by a process which comprises the reaction of halophenols with oxygen in the presence of a basic cupric salt and an amine that is a strongly coordinating liquid that does not form stable chelates with copper ions. More particularly, this invention relates to the oxidation of 2,6-dihalogen-substituted phenols to lightly branched poly-(2,6-dihalophenylene) ethers in the presence of a dissolved copper-amine complex.

BACKGROUND

In a series of articles by Brackman, et al., Rec. trav. chim., 74, 937–955, 1021–1039, 1071–1080, 1101–1119 (1955), there is disclosed a process for oxidizing phenols in the presence of amines and cupric salts. This series of articles reports experimental work wherein oxygen was reacted with monocyclic and bicyclic phenols in the presence of a cupric salt and primary, secondary and tertiary amines. In the presence of primary and secondary amines, both the monocyclic and bicyclic phenols were oxidized to produce chemical compounds in which the amine formed an integral part of the product molecule. In the presence of a tertiary amine, only the bicyclic phenols, such as the naphthols, could be oxidized. In no instance was there evidence of polymerization to form a polyaryl ether.

The oxidative coupling of phenols in the presence of a copper-amine complex has been described by Hay in U.S. Patent Nos. 3,306,874 and 3,306,875, incorporated herewith by reference. The polymerization reaction involves oxidizing certain monohydric, monocyclic phenols in the presence of a catalyst comprising a basic cupric salt and, respectively, a primary, secondary or tertiary amine. The process of Hay, while operative in the case of 2,4-dihalophenols, specifically excludes phenols containing halogen in both the 2 and the 6 positions.

A modification of the general method is shown in U.S. Patent No. 3,234,183, incorporated herewith by reference, where certain metallo-aromatic heterocyclic amine complexes of 2,4,6-trihalophenols are decomposed at temperatures in excess of 80° C. to yield highly branched poly-2,6-dihalophenylene ethers of intermediate molecular weights. This method cannot be applied to the production of higher molecular weight polymers and also fails in the polymerization of 2,6-dihalophenols having hydrogen in the para position.

A different method for the formation of poly-(2,6-dihalophenylene) ether is disclosed by Stomatoff in U.S. Patent No. 3,257,357, incorporated herein by reference. This process comprises admixing free oxygen with an initiator such as an inorganic peroxide, an organic peroxide, a persulfate, etc. with an aqueous solution of a phenolate ion in the presence of a liquid organic solvent immiscible with the aqueous phase. The phenol polymerized must be a 2,4,6-trihalophenol and it is disclosed that the process is not operable with a 2,6-dihalophenol. In addition, the polymer so formed is a linear 1,4-polyphenylene ether or a linear polyphenylene ether containing a mixture of both 1,2- and 1,4-units.

Poly-(2,6-dihalophenylene) ethers have been elsewhere described in the prior art. A common method of preparation is by the elimination of metal halide from metal salts (particularly alkali metal and silver salts) of 2,4,6-trihalophenols. These procedures yield, in general, lower molecular weight products which are recognized as being highly branched and unsuitable for commercial use.

STATEMENT OF THE INVENTION

Unexpectedly, I have now discovered a general, convenient, and economic method of oxidatively coupling 2,6-dihalogen-substituted monohydric, monocyclic phenols to yield a lightly branched poly-(2,6-dihalophenylene) ether which comprises reacting said phenols with oxygen at elevated temperatures in the presence of the complex of a basic cupric salt and an amine selected from the group consisting of aliphatic and cyclic secondary and tertiary amines, and, preferably, in solution in a solvent for the 2,6-dihalo-substituted phenol and the polymeric product. It was surprising and unexpected to find, in view of the teaching of Brackman et al., with regard to the oxidation of monocyclic and polycyclic phenols, that my method is applicable to monocyclic, monohydric phenols without the amine becoming an integral part of the reaction product. It was also unexpected to find, in view of the teaching of Hay with regard to the oxidative polymerization of monocyclic, monohydric phenols, that my method is applicable to the polymerization of 2,6-dihalogen-substituted phenols. This is an important advantage as the cost of 2,6-dihalogen-substituted phenols is substantially lower than 2,4,6-trihalogen-substituted phenols. Further, according to the present invention, there has been discovered an improvement in the basic procedures of Hay and Stomatoff whereby phenols substituted in the 2 and 6 positions with halogen may be polymerized to yield lightly branched higher molecular weight poly-(2,6-dihalophenylene) ethers, having intrinsic viscosities of at least 0.09, by oxidatively coupling, in solution, a phenol, substituted with halogen in the 2 and 6 positions, in the presence of molecular oxygen and a copper-amine complex derived from a basic cuprous salt and certain amines selected from the group consisting of aliphatic and cyclic secondary and tertiary amines. This lightly branched higher molecular weight poly-(2,6-dihalophenylene) ether is an especially surprising development. It is known in the art that a highly branched polymer is unduly brittle, extremely soluble in solvents, and otherwise unsuitable for most commercial applications. Alternatively, an exclusively linear polymer is insoluble in organic solvents, has an excessively high melting point, and thus a high melt viscosity making molding difficult, and low tensile strength with undue elongation. In contrast thereto, the lightly branched polymers of this invention overcame the difficulties encountered with excessive branching and complete linearity.

DETAILED DESCRIPTION OF THE INVENTION

The reaction to which my invention is directed involves the hydrogen atom of the hydroxyl group of the halophenol molecule, a hydrogen substituent in the para position of the halophenol molecule, and oxygen, with the formation of water. While described as an oxidative coupling or polymerization, it is probable that the reaction does not directly include an oxidation of the halophenol molecule with molecular oxygen, but is rather an oxidation of the copper-amine catalyst which is then active in both condensation and oxidation polymerizations of the halophenol.

The general method of carrying out the process of this invention is to pass an oxygen-containing gas through a non-aqueous solvent mixture containing, as starting material, one or more monohydric, monocyclic halophenols; from 0 to 99 mole percent of other monohydric, monocyclic phenols; and a complex comprising at least one basic cupric salt and at least one amine selected from the group preferred under the specific reaction conditions as described hereinbelow.

The halophenols which can be coupled by my process are represented by the following formula:

(I)

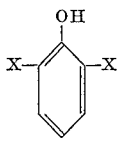

where X is selected from the group consisting of iodine, bromine and chlorine. Typical examples of suitable phenols include 2,6-dichlorophenol, 2,6-dibromophenol, 2,6-diiodophenol, 2-chloro-6-bromophenol, etc.

In the practice of this invention it has been found that the specific amine must be a strongly coordinating ligand which does not form stable chelates with copper ions. I have defined the amines which I have discovered to be useful in this invention by the term "cuprophilic." The cuprophilic amines are those which, while coordinating strongly with copper, either do not form chelates or cannot form stable chelates therewith. The complex of a basic cupric salt with a cuprophilic amine is further defined herein as "catalytically active," indicating that the complex is functionally stable in the presence of the halophenols of this invention. The factors which determine the stability of the strongly coordinated and non-chelated, or weakly chelated, cuprophilic amine complexes are well known in the art. These factors are discussed in detail in a number of texts including: Bailar, The Chemistry of the Coordination Compounds, New York, Reinhold, 1956 (see especially Chapters 4 and 5); Martell and Calvin, Chemistry of the Metal Chelate Compounds, New York, Prentice-Hall, 1952; and Basolo and Pearson, Mechanisms of Inorganic Reactions, New York, Wiley, 1958.

The cuprophilic amines are inclusive of secondary and tertiary amine ligands comprising strongly coordinating unidentate ligands and strongly coordinating, weakly chelating, polydentate ligands. Unidentate ligands are those which can have per molecule no more than one point of attachment, or coordinate linkage, to a metal ion and which do not form chelating compounds. The aliphatic and cyclic monamines are examples of unidentate ligands. Polydentate ligands can have per molecule two or more points of attachment, or coordinate linkages, to a metal ion, thus creating those metallo-heterocyclic ring systems which are known as chelate compounds. The most commonly used polydentate ligands are the bidentate alkane diamines.

The stability of chelate ring structures is known to be influenced by a number of steric factors, including ring size and hindering substituents, particularly on the nitrogen atoms. Polyamines which yield five membered rings form the most stable chelates. There is considerable steric strain introduced in four, six, seven, and greater-sized rings, and this is shown in a greater instability of the complexes. The strain caused by substituents on the nitrogen atoms is known as F-strain and also leads to a decreased stability. Complexes according to this invention are unstable; that is to say that they will yield chemically reactive copper ions which, for example, can be precipitated by strong inorganic alkalies or may be otherwise evidenced, as by decomposition of hydrogen peroxide. Selection of a cuprophilic, potentially strained polyamine ligand can thus be understood as being dependent upon the number of carbon atoms separating a pair of nitrogen atoms and upon the nature of the substituents on the nitrogen atoms.

Illustratively, consider the secondary and tertiary alkane diamines of the formula:

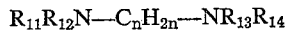

where $R_{11}$ is selected from $C_1$ to $C_{10}$ alkyl, $C_1$ to $C_6$ hydroxyalkyl, and aralkyl; $R_{12}$ is the same as $R_{11}$ and, in addition, hydrogen; $R_{13}$ is the same as $R_{11}$, and, in addition, aryl; $R_{14}$ is the same as $R_{12}$ and, in addition, aryl; $n$ is an integer from 1 to 10; and the nitrogen atoms are separated by 1 to 10 carbon atoms. The groups (RRN—) may also represent a heterocyclic substituent as morpholino, piperidino, etc. Polyamines conforming to this formula are potentially unstable ligands and thus generally operable in the process of my invention; provided that when the nitrogen atoms are separated by only two carbon atoms, $R_{13}$ and $R_{11}$ should be bulky ($C_3$ and higher) substituents, such as isopropyl, amyl, benzyl, etc. Confirming this, it has been found experimentally that complexes with tetramethyl-1,2-ethylenediamine are just marginally effective in my process (giving only trace amounts of polymer), while ethylenediamine, known to be a strong chelating agent, is totally inoperable. Tetramethyl-1,2-ethylenediamine can therefore be considered as a standard reference in defining the cuprophilic amines. Amines forming complexes of greater stability than tetramethyl-1,2-ethylenediamine, as measured by the dissociation constant, free energy of formation, or the like, are generally inoperative, while those forming complexes of lesser stability comprise the potentially strained ligands of this invention.

Typical examples of strongly coordinating, weakly chelating polyamines are: N,N,N',N'-tetramethylmethylenediamine, N,N,N',N'-tetraamyl-1,2-ethylenediamine, N'-benzyl-N,N-dimethyl-1,2-ethylenediamine, symmetrical dibenzyl-di-methyl-1,2-ethylenediamine, 1,2-ethylene-N,N'-dimorpholine, N,N,N',N'-tetramethyl-1,3-propanediamine, N,N,N',N'-tetramethyl-1,3-butanediamine, and N,N,N',N'-tetramethyl-1,4-butanediamine. Other polyamines, following the teachings above, may be used, including polyalkylene-polyamines, amino-alkyl substituted aromatic heterocyclic amines, bifunctional heterocyclic amines, etc.

The expression "secondary and tertiary aliphatic amines" as used in this specification describes both the strongly coordinating, potentially unstable, polydentate aliphatic (and substituted aliphatic) polyamines and the strongly coordinating secondary and tertiary unidentate aliphatic (and substituted aliphatic) monoamines. Since the polyamines are virtually all strong bases, and because of the steric factors discussed, their cuprophilic properties are substantially independent of their relative strength as bases. These factors, however, are not evident with the unidentate ligands, which do not form chelate ring compounds. In the case of the unidentate ligands it is recognized in the art that the ability to form stable coordinate bonds, as measured by the dissociation constant, the free energy of formation, etc., is a function of the basicity of the amine. The more strongly coordinating ligands are also found to be the stronger bases. The base strength is usually indicated by the quantity $pK_{ACID}$ which is the negative logarithm of the acid dissociation constant of the amine. This quantity increases as an exponential function of the basicity and stands in substantially linear relation to the dissociation constants of the complexes from homologous series of amines. In general the strongly coordinating ligands of my invention have been found, with few exceptions, to have a pK$_{ACID}$ of greater than 6.0, with the higher values seldom exceeding 13.0. Pyridine, for example, which is inoperative, has a pK$_{ACID}$ of 5.4, while the 2-methylpyridines have a pK$_{ACID}$ of greater than 6.0 and are strongly coordinating ligands within the meaning of this invention. One obvious exception to this rule is dimethylaniline which, while having a pK$_{ACID}$ of 5.1, nevertheless forms a catalytically active complex and must be considered as also a strongly coordinating ligand. Pyridine and dimethylaniline are convenient reference standards, respectively, for heterocyclic and aliphatic (and substituted aliphatic) ligands.

The preferred secondary and tertiary aliphatic monoamines of this invention may be defined as derivatives of dimethylamine according to the formula:

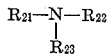

where R$_{21}$ and R$_{22}$ are each selected from C$_1$ to C$_{10}$ alkyl, C$_1$ to C$_6$ hydroxyalkyl and aralkyl; and R$_{23}$ is selected from hydrogen, C$_1$ to C$_{10}$ alkyl, C$_1$ to C$_6$ hydroxyalkyl, aralkyl, and aryl. Typical examples of strongly coordinating secondary and tertiary aliphatic monoamines are: dimethylamine, diethylamine, diisopropylamine, di-n-butylamine, methylethylamine, methylbenzylamine, dibenzylamine, dioctylamine, trimethylamine, triethylamine, trihexylamine, dimethylbenzylamine, methylethylbenzylamine, betadiethylaminoethanol, dimethylaniline, etc.

Another class of unidentate cuprophilic ligands useful in the practice of this invention are the strongly coordinating saturated, and aromatic heterocyclic amines. Within the requirements of this specification, aromatic heterocyclic ligands may be selected from the appropriate species represented by the pyridines, pyrroles, imidazoles, indoles, thiazoles, pyrazoles, oxazoles, quinolines, pyrazines, pyrimidines, purines, oxazines, thiazines, etc., and including fused ring derivatives and the ring-substituted derivatives (with alkyl, aryl, aralkyl, alkoxy, aryloxy and the like substituents). The ligands selected must, of course, be cuprophilic; that is, the aromatic heterocyclic amines must have a pK$_{ACID}$ of greater than 6.0 and form catalytically active complexes with copper. Thus, while pyrrole and pyridine are inoperative, many of their derivatives are cuprophilic as defined herein, and, with respect to pyridine derivatives, are exemplified by 2-methylpyridine, 2,4 - dimethylpyridine, 2,4,6 - trimethylpyridine, 2-propylpyridine, 2-benzylpyridine, 2-(5-nonyl)-pyridine, 2-(2-methoxyethyl) - 6 - methylpyridine, 2-aminopyridine, 2-(2-pyridyl)-pyridine, etc. It should be noted that the latter two pyridine compounds are properly to be included with the cuprophilic polydentate ligands discussed above.

Secondary and tertiary saturated heterocyclic amines comprise the hydrogenation (and partial hydrogenation) products, and the N-substituted derivatives thereof, of the aromatic heterocyclic compounds previously discussed. The cuprophilic members of this group will, again, have a pK$_{ACID}$ of greater than 6.0 and form catalytically active complexes with copper. The effect of ring saturation is to end resonance stabilization of the amine through hydrogenation of one or more double bonds, and this will almost invariably enchance the basicity of the amine. Thus, a perhydrogenation product of non-cuprophilic pyridine is piperidine, which is cuprophilic and has a pK$_{ACID}$ of 11.3. Further exemplary are cuprophilic N-alkyl piperidines, pyrrolidines, N-alkyl pyrrolidines and pyrroles, imidazolidines, quinolidines, N-alkylquinolidines, thiazolidines, morpholines, N-alkylmorpholines, thiomorpholines, etc., which otherwise meet the requirements of this invention. When the ligand is tertiary, the N-substituent is preferably alkyl, aralkyl, hydroxyalkyl, etc. Specifically exemplary of the diversity of the cuprophilic saturated heterocyclic ligands are morpholine, N-methylmorpholine, N-benzylmorpholine, N-methyl-2-pyrrolidine, and 1,4-diazo-bicyclo-(2.2.2) octane.

While certain groups and representative species of cuprophilic secondary and tertiary amines have been described, it is to be understood that this presentation is intended as illustrative and that the definition of cuprophilic amine ligands falling within the scope of this invention is broadly inclusive of all secondary and tertiary amines (and certain of their derivatives as will be apparent to those skilled in the art) which comprise strongly coordinating, weakly chelating, potentially strained, polydentate ligands and strongly coordinating, unidentate ligands. These ligands will in general be further defined as those secondary and tertiary amines whose catalytically active complexes with copper are more strongly coordinated than those of pyridine and which are more weakly chelated than those of N,N,N',N'-tetramethyl-1,2-ethylenediamine.

The halophenols of this invention, as defined in the above formulae, may be copolymerized with up to 99 mole percent of one or more second phenolic compounds. These phenolic comonomers are identical with the phenols described in Hay, Patent No. 3,306,875 and have the formula:

(II)

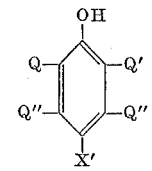

where X' a member selected from the group of chlorine, bromine, iodine and hydrogen; Q is a monovalent substituent selected from the group consisting of hydrogen, hydrocarbon radicals free of a tertiary α-carbon atom, halohydrocarbon radicals having at least two carbon atoms between the halogen atom and phenol nucleus and being free of a tertiary α-carbon atom, hydrocarbonoxy radicals free of an aliphatic tertiary α-carbon atom, and halohydrocarbonoxy radicals having at least two carbon atoms between the halogen atom and phenol nucleus and being free of an aliphatic tertiary α-carbon atom; Q' and Q" are both the same as Q and in addition halogen, with the proviso that X must be halogen when Q and Q' are each substituents selected from the group consisting of aryl radicals, haloaryl radicals, hydrocarbonoxy radicals and halohydrocarbonoxy radicals. Preferably, Q" and X' represent hydrogen. The term "free of a tertiary α-carbon atom" means that the terminal carbon atom of the aliphatic hydrocarbon substitutent which is attached to the phenol nucleus (either directly, if the substituent is hydrocarbon or halohydrocarbon, or through the oxygen atom, if the substituent is hydrocarbonoxy or halohydrocarbonoxy) has at least one hydrogen atom attached to it. Typical examples of Q, Q', and Q" as well as preferred phenols may be found in the above noted Hay patent.

In providing the catalyst comprising a basic cupric salt and a cuprophilic amine, the particular copper salt used will, in general, have small effect on the character of the product. I may start with either a cupric of cuprous salt. The only requirement is that if a cuprous salt is used, it must be capable of existing in the cupric state and must form a complex with the cuprophilic amine that is soluble in the reaction medium. The necessity for being able to exist in the cupric state is based on my belief that the oxidation of the phenol is accomplished by the oxygen reacting with the cuprophilic amine-cuprous salt complex to form an intermediate, activated, cuprophilic amine-basic cupric salt complex that reacts with the phenol to form an unstable intermediate which decomposes forming the self-condensation of the phenol and water as products and regenerates the amine-cuprous salt complex. This activated complex can also be formed by starting originally with a cupric salt in making the copper amine complex, for example, by using a reducing agent, e.g., copper metal, which unites with the liberated anion and forms the cuprous salt in situ. However, more simple methods may be used, for example, the activated complex may be formed by adding cupric hydroxide to a cupric salt, adding a base to a cupric salt, adding an alkaline salt of phenol (which could be the phenoxide of the phenol reactant) to a cupric salt, by treating a cupric salt with an ion exchange resin having exchangeable hydroxyl groups, etc. Preferably, these reactions are carried out in the presence of the cuprophilic amine to prevent precipitation of the basic cupric salt, but it is possible to add the cuprophilic amine later to dissolve the basic cupric salt even as a precipitate. Typical examples of satisfactory basic cupric salts which may be complexed with the amines of this invention are: cupric oxychloride, cupric oxybromide, basic cupric sulfate, etc.

The copper-amine complex providing the catalyst for the process of this invention is preferably and most conveniently prepared in situ by addition of the component cuprous salt and amine to the reaction mixture. The cuprous salt must be soluble in the amine; that this, it must form a complex with the amine (which is further soluble in the reaction medium) and must also be capable of existing in the cupric state. Among the cuprous salts suitable for this process are cuprous chloride, cuprous bromide, cuprous sulfate, cuprous azide, cuprous tetramine sulfate, cuprous acetate, cuprous proprionate, cuprous palmitate, cuprous benzoate, etc. Preferred cuprous salts are the chloride, bromide, and azide. Cuprous sulfite may also be used since it is oxidized to a basic sulfate in the system. Among cuprous salts found unsatisfactory in the present process are the iodide, sulfide, cyanide, thiocyanide, etc., which form unstable cupric salts or do not complex with the amine. Amine complexes of cuprous nitrate and cuprous chloride, which are not known to exist, may be prepared in situ.

Only a small catalytic amount of the copper-amine complex is necessary for the polymerization. In general, it has been found satisfactory to have sufficient of the copper-amine complex to provide a mole ratio of monomer to copper within the range of 1 to 150 with variations outside of this range being used as necessary or desired and a ratio of 8 to 25 being generally preferred.

Molecular oxygen must be present in the recation mixture. In that case, it has been found that oxygen absorption is in proportion to the amount of amine present and independent of the amount of phenol being polymerized. The oxygen requirement is not satisfactorily met by addition to the copper-amine complex in solution prior to the initiation of the polymerization. Introduction of oxygen, or appropriate oxygen-containing gas, should continue throughout the course of the reaction, although in certain recognizable instances it may be terminated following saturation of the copper-amine complex. When there is a para hydrogen, a stoichiometric amount of oxygen will be required for its removal.

The present process is preferably carried out in a substantially homogeonous solution including the copper-amine complex, the monomer or monomers, the product polymer, and a relatively inert non-aqueous solvent. Among the preferred solvents are aromatic hydrocarbons, such as benzene, toluene, xylene, etc.; and halogenated hydrocarbons, such as chlorobenzene, dichlorobenzene, chloroform, trichlorethylene, tetrachloroethylene, etc. Other solvents, such as alcohols, ketones, aliphatic hydrocarbons, nitrohydrocarbons, ethers, esters, amides, sulfoxides, etc., may be employed provided they do not interfere or enter into the oxidation reaction and so long as the product remains soluble therein. In order to prevent decomposition of the copper-amine complex by water, it is often desirable to remove water physically or to have present a drying agent. Any relatively inert, and preferably inexpensive desiccant, may be used. Preferred physical means include azeotropic distillation and purging with an inert gas.

The temperature at which the reaction is carried out should be between ambient temperature (about 25° C. to 35° C.) and 120° C., depending upon the nature of the amines and halophenols as hereinabove defined. At about ambient temperature the rate of polymerization becomes prohibitively slow, and it is usually undesirable to allow the temperature to exceed 100° C. In general, it has been found that the optimum temperature range is 65°–80° C.

In the copolymerization, the non-halogenated comonomer will, in general, have a much lower optimum polymerization temperature. The copolymerization is desirably achieved by carrying out the reaction in two stages, first for a period of time at the lower temperature optimum for the comonomer, followed by a final period at the higher temperature optimum for the halophenol. As shown by fractionation of the product, the halophenyleneoxide radicals are homogeneously distributed over the various molecular weight fractions.

The halophenols corresponding to Formula I, when polymerized by the process of this invention, will form polyhalophenylene ethers comprising:

(III) 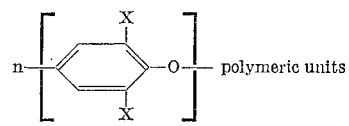 polymeric units where each X is as defined and $n$ is an indeterminate integer greater than ten. When the oxidative polymerization reaction includes a comonomer according to Formula II, then the polyhalophenylene ether will further comprise:

(IV) 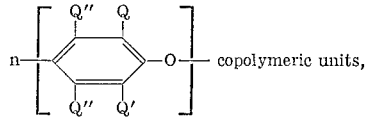 copolymeric units, where Q, Q′, Q″, and $n$ are as defined. To a certain extent, the ortho position, when substituted by halogen, in the halophenols of Formula I, will be oxidatively coupled with other phenolic species entering into the overall polymerization reaction. The result of this is that the polyhalophenylene ether derived through my process will be lightly branched with branching ortho phenoxy radicals derived from any of the monomeric halophenols or comonomeric phenols which may have been included in the reaction mixture. Since most of these phenolic species are preferably at least 2,6-disubstituted, this branching ortho phenoxy radical is hereinafter referred to as a branching 2,6-disubstituted-1-phenoxy radical with the understanding that it may be derived from any of the phenolic compounds above noted.

When the halophenols are polymerized by the process of this invention, there is formed a poly-(2,6-dihalophenylene-1,4) ether consisting essentially of a plurality of covalently-bonded oxyphenylene units which comprise:

(V) 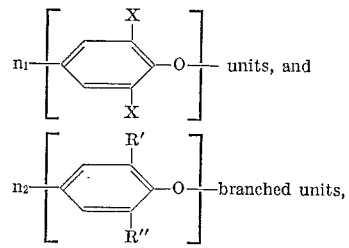

where X is as defined; R′ and R″ are selected from the group consisting of iodine, bromine, chlorine, and a branching 2,6-dihalosubstituted-1-phenoxy radical where the halogen substituent is the same as X; and $n_1$ and $n_2$ are selected from the integers 1, 2, 3, . . ., with at least one of R' and R" representing the branching 2,6-disubstituted-1-phenoxy radical which, being derived from the reactant phenols, is included in the sum $n_1+n_2$.

By my process, polyhalophenylene ethers may be prepared having low, intermediate, or higher molecular weights. The molecular weight of any particular polymer will, of course, be dependent upon the halophenol, and other phenols, used as the starting reactant or reactants, the amine used in the catalyst system, the temperature, and the reaction conditions generally. In this specification, a higher molecular weight polymer is defined as one having a minimum intrinsic viscosity of at least 0.09. The intrinsic viscosity, which is known to be a function of the molecular weight of any polymer, has been determined at every instance herein by extrapolation to zero concentration of the specific viscosities obtained from the polymers in chloroform solution at 30° C. according to standard procedures. When not otherwise stated, the intrinsic viscosities cited are understood to be designated by the units, deciliters per gram.

In a preferred mode of this invention, lightly branched higher molecular weight poly-(2,6-dihalophenylene-1,4) ethers having an intrinsic viscosity of at least 0.09 can be obtained by the polymerization of the halophenols of Formula I. This higher molecular weight polymer comprises the oxyphenylene units of Formula V and is further defined in that the ratio of $n_2$ to the sum of $n_1+n_2$ is at least 0.05 and less than 0.25, within which definition the polymer of this invention is considered to be lightly branched.

Further, by the process of my invention there is prepared lightly branched, higher molecular weight copolymers formed by the polymerization of the halophenols of Formula I with the phenols of Formula II. For example, copolymerization of the halophenol of Formula I with a 2,6-disubstituted phenol derived from Formula II will form a copolymer consisting essentially of a plurality of covalently bonded oxyphenylene units comprising:

(VI)

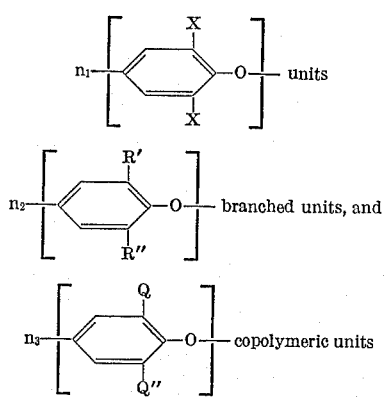

where X, R', R", Q and Q' are as defined: the 2,6-disubstituted-1-phenoxy radical is included in the sum $n_1+n_2+n_3$; $n_1$, $n_2$ and $n_3$ are selected from the integers 1, 2, 3, . . .; the ratio of $n_2$ to the sum of $n_1+n_2$ is greater than zero and less than 0.25 and preferably varies between 0.05 and 0.25; and the ratio of $n_3$ to the sum of $n_1+n_2+n_3$ is 0 to 0.99.

Thus, as in the preferred embodiments of my invention, when the starting phenols are 2,6-dichlorophenol and 2,6-dimethylphenol, a higher molecular weight, lightly branched polymer will, from Formula X, comprise:

(VII)

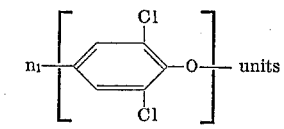 units

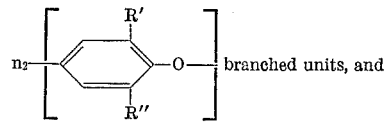 branched units, and

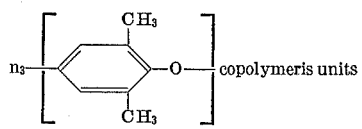 copolymeris units where the ratio of $n_2$ to the sum $n_1+n_2$ is greater than 0 and less than 0.25 and preferably varies between 0.05 and 0.25, and the ratio of $n_3$ to the sum of $n_1+n_2+n_3$ is 0 to 0.99.

While it is possible that each of R' and R" in Formulae V–VII may represent a branching ortho phenoxy radical, this is highly improbable; and for the purposes of this specification, it is most convenient to conclude that only one branching ortho phenoxy radical is present in any one branched unit with the remaining R' and R" representing halogen. Thus, the branching density, that is, the ratio of ortho phenoxy linkages to the number of halogenated units, linear and branched, is equal to the ratio of $n_2$ to the sum of $n_1+n_2$.

In the special case of the polymers derived from the halophenols of Formula I (when each X is the same halogen), the empirical value of the ratio $n_2$ to the sum of $n_1+n_2$ (when there is assumed to be only one branching ortho phenoxy linkage for each branched unit) may conveniently be calculated from the halogen analysis of the polymer according to the equation (VIII)
$$\frac{n_2}{n_1+n_2} = \frac{2(H_t - H_f)}{H_t}$$

wherein $H_t$ is the theoretical weight percent of halogen and $H_f$ is the weight percent halogen found in the polymer. This formula is applicable only in the case of polymers derived from 2,6-dihalophenols in the absence of other halogenated comonomers. As calculated from the equation above, the empirical ratio of $n_2$ to the sum of $n_1+n_2$ is greater than 0 and less than 0.25 for the lightly branched polymers and copolymers of my invention and preferably varies between 0.05 and 0.25. If, in any event, there is more than one ortho phenoxy radical in the branched polymeric units, this will not affect the calculated ratio, which will only be lowered thereby while remaining less than 0.25. In the case of homopolymers of 2,6-dichlorophenol, a chlorine content of 39–44% by weight substantially corresponds to the stated range of this ratio. The discovery of the lightly branched polymers of my invention is both significant and unexpected since it has been determined that the higher molecular weight polyhalophenylene ethers of the prior art have a branching density, equivalent to the present ratio, of greater than 0.3 resulting in excessively brittle and commercially unusable products.

The following examples are given as illustrative of the practice of my invention and not in limitation thereof:

Example 1

A 1,000 ml. 3-neck flask was provided with a sealed mechanical stirrer, a thermometer, an oxygen inlet, a gas outlet, and an external heating mantle. In the flask, 10 grams of 2,6-dichlorophenol, 0.5 gram of cuprous chloride, and 3 ml. N,N,N',N'-tetramethyl-1,3-butanediamine were dissolved in 100 ml. chlorobenzene. The mole ratio of monomer to copper was 12.3 and the mole ratio of amine to copper was 3.3. Twenty grams of anhydrous magnesium sulfate were added as the drying agent. Oxygen gas was passed through the rapidly stirred mixture while the temperature was raised slowly. When the temperature reached 50° C., the reaction became rapid and external cooling with a water bath was required to prevent the temperature from rising over 70° C. The temperature was maintained at 65° C. for one and one-half hours while oxygen was passed through continuously. The reaction mixture was filtered to remove the drying agent, and the filtrate was added to 750 ml. methanol containing 10 ml. 38% aqueous hydrochloric acid. The resulting precipitate was filtered off, washed thoroughly with methanol, and dried. The yield was 7.0 grams (70% of theoretical) and had an intrinsic viscosity (at 30° C. in chloroform) of 0.16 dl. per gram. The chlorine content of the product was 40.4% by weight. The theoretical chlorine content for a single repeating polymer unit is 44.4%. Based upon the above formula, the ratio of $n_2$ (branched units) to $n_1+n_2$ (total number of units in the poymer) is approximately 0.18.

Example 2

Similarly to Example 1, 2,6-dichlorophenol was polymerized in the presence of cuprous chloride and N,N,N',N'-tetramethyl-1,3-propanediamine providing a mole ratio of monomer to copper of 9.1 and a mole ratio of amine to copper of 3.0. The reaction was carried out at 70° C. for two hours. The yield was 97% of a polymer of intrinsic viscosity 0.17 and having a chlorine content of 40.6% by weight. When this reaction was repeated at 90° C., the yield was only 31%; when repeated with a mole ratio of monomer to copper of 1.8, the yield was only 17% and the intrinsic viscosity 0.06.

Example 3

By the method of Example 1, 2,6-dichlorophenol was polymerized in the presence of cuprous bromide and N,N,N',N'-tetramethyl-1,3-propanediamine providing a mole ratio of monomer to copper of 8.2 and a mole ratio of amine to copper of 2.8. The reaction was carried out at 75° C. for two hours. The yield was 96% of a polymer of intrinsic viscosity 0.11 and having a chlorine content of 38.9% by weight. This corresponds to a ratio of $n_2$ to $n_1+n_2$ of 0.25.

Example 4

2,6-dichlorophenol was polymerized, by the procedure of Example 1, in the presence of cuprous chloride and N,N,N',N'-tetramethyl-1,3-butanediamine. The mole ratio of monomer to copper was 2.0, and the mole ratio of amine to copper was 2.9. The reaction was carried out at 80° C. for two hours. The yield was 47% of a polymer of intrinsic viscosity 0.14 and having a chlorine content of 41.5%. This corresponds to a ratio of $n_2$ to $n_1+n_2$ of 0.13.

Example 5

Using the method of Example 1, 2,6-dichlorophenol was polymerized in the presence of cuprous chloride and N,N,N',N'-tetramethyl-1,4-butanediamine. The mole ratio of monomer to copper was 9.1, and the mole ratio of amine to copper was 2.9. The reaction was carried out at 60° C. for two hours. The yield was 71% of a polymer of intrinsic viscosity of 0.09 and having a chlorine content of 42.9% by weight. This corresponds to a ratio of $n_2$ to $n_1+n_2$ of 0.07.

Example 6

The reaction of Example 5 was repeated at 75° C. for two hours. The yield was 90% of a polymer of intrinsic viscosity 0.12 and having a chlorine content of 41.9% by weight. This corresponds to a ratio of $n_2$ to $n_1+n_2$ of 0.11.

Example 7

Similarly to Example 1, 2,6-dichlorophenol was polymerized in the presence of cuprous chloride and N,N,N',N'-tetramethyl-1,6-hexanediamine providing a mole ratio of monomer to copper of 9.1 and a mole ratio of amine to copper of 2.5. The reaction was carried out at 75° C. for two hours. The yield was 94% of a polymer of intrinsic viscosity 0.10 and having a chlorine content of 39.2% by weight. This corresponds to a ratio of $n_2$ to $n_1+n_2$ of 0.23.

Example 8

By the procedure of Example 1, 2,6-dichlorophenol was polymerized in the presence of cuprous chloride and N,N,N'N'-tetramethylmethylenediamine providing a mole ratio of monomer to copper of 9.1 and a mole ratio of amine to copper of 3.4. The reaction was carried out at 95° C. for two hours. The yield was 96.5% of a copolymer of intrinsic viscosity 0.09 and having a chlorine content of 39.4% by weight. This corresponds to a ratio of $n_2$ to $n_1+n_2$ of 0.22.

Example 9

Similarly to Example 1, 2,6-dichlorophenol was polymerized in the presence of cuprous chloride and N,N'-dimethyl-1,3-propanediamine providing a mole ratio of monomer to copper of 9.1 and a mole ratio of amine to copper of 3.5. The reaction was carried out at 75° C. for two hours. The yield was 80% of a polymer of intrinsic viscosity 0.10 and having a chloride content of 40.6% by weight. This corresponds to a ratio of $n_2$ to $n_1+n_2$ of 0.17. When this example was repeated at a temperature of from 20–25° C. for 28 hours, no polymer was formed.

Example 10

Using the method of Example 1, 2,6-dichlorophenol was polymerized in the presence of cuprous chloride and morpholine. The mole ratio of monomer to copper was 9.1, and the mole ratio of amine to copper was 5.7. The reaction was carried out at 90° C. for two and one-half hours. The yield was 87% of a polymer of intrinsic viscosity 0.11 and having a chlorine content of 40.5% by weight. This corresponds to a ratio of $n_2$ to $n_1+n_2$ of 0.18.

Example 11

2,6-dichlorophenol was polymerized, by the procedure of Example 1, in the presence of cuprous bromide and morpholine. The mole ratio of monomer to copper was 8.2, and the mole ratio of amine to copper was 5.1 The reaction was carried out at 90° C. for two and one-half hours. The yield was 88.5% of a polymer of intrinsic viscosity 0.10 and having a chlorine content of 40.0% by weight. This corresponds to a ratio of $n_2$ to $n_1+n_2$ of 0.20.

Example 12

As in Example 1, 2,6-dichlorophenol was polymerized in the presence of cuprous chloride but using N-methylmorpholine. The ratio of monomer to copper was 9.1, and the mole ratio of amine to copper was 5.0. The reaction was carried out at 90° C. for two hours. The yield was 93% of a polymer of intrinsic viscosity 0.16 and having a chlorine content of 42.5%. This corresponds to a ratio of $n_2$ to $n_1+n_2$ of 0.09.

Example 13

By repeating Example 12 at 90° C. for five hours, there was obtained in a yield of 96% a polymer of intrinsic viscosity 0.19 and having a chlorine content of 40.6% by weight. This corresponds to a ratio of $n_2$ to $n_1+n_2$ of 0.17.

Example 14

Example 12 was repeated at 90° C. for sixteen hours. The yield was 95% of a polymer of intrinsic viscosity 0.15 and having a chlorine content of 41.5% by weight. This corresponds to a ratio of $n_2$ to $n_1+n_2$ of 0.13.

Example 15

The reaction of Example 12 was repeated using meta-xylene as the solvent. The yield was about 30% of a polymer of intrinsic viscosity 0.15 and having a chlorine content of 40.5%. This corresponds to a ratio of $n_2$ to $n_1+n_2$ of 0.20.

Example 16

Similarly to Example 1, 2,6-dichlorophenol was polymerized in the presence of cuprous bromide and N-methylmorpholine providing a mole ratio of monomer to copper of 8.2 and a mole ratio of amine to copper of 4.4 The reaction was carried out at 90° C. for two and one-half hours. The yield was 94% of a polymer of intrinsic viscosity 0.13 and having a chlorine content of 42.7% by weight. This corresponds to a ratio of $n_2$ to $n_1+n_2$ of 0.08.

Example 17

As in Example 1, 2,6-dichlorophenol was polymerized in the presence of cuprous chloride with the amine being N-methylmorpholine. The mole ratio of monomer to copper was 9.1, and the mole ratio of amine to copper was 20. The reaction was carried out at 90° C. for two and one-half hours. The yield was 93% of a polymer of intrinsic viscosity 0.11 and having a chlorine content of 40.2% by weight. This corresponds to a ratio of $n_2$ to $n_1+n_2$ of 0.19.

Example 18

By the method of Example 1, 2,6-dichlorophenol was polymerized in the presence of cuprous chloride and N-methylmorpholine providing a mole ratio of monomer to copper of 23 and a mole ratio of amine to copper of 2.4. The reaction was carried out at 90° C. for two hours. The yield was 94% of a polymer of intrinsic viscosity 0.11 and having a chlorine content of 40.9% by weight. This corresponds to a ratio of $n_2$ to $n_1+n_2$ of 0.16.

Example 19

Similarly to Example 1, 2,6-dichlorophenol was polymerized in the presence of cuprous chloride and 2-aminopyridine providing a mole ratio of monomer to copper of 9.1 and a mole ratio of amine to copper of 2.5. The reaction was carried out at 90° C. for two hours. The yield was 92.5% of a polymer of intrinsic viscosity 0.12 and having a chlorine content of 42.1% by weight. This corresponds to a ratio of $n_2$ to $n_1+n_2$ of 0.10.

Example 20

Using the method of Example 1, 2,6-dichlorophenol was polymerized in the presence of cuprous chloride and 2,2'-bipyridine providing a mole ratio of monomer to copper of 9.1 and a mole ratio of amine to copper of 3.2. The reaction was carried out at 90° C. for two hours. The yield was 94% of a polymer of intrinsic viscosity 0.11 and having a chlorine content of 40.9% by weight. This corresponds to a ratio of $n_2$ to $n_1+n_2$ of 0.16.

Example 21

Similarly to Example 1, 2,6-dichlorophenol was polymerized in the presence of cuprous chloride and 2,6-dimethylpyridine providing a mole ratio of monomer to copper of 1.8 and a mole ratio of amine to copper 4.0 The reaction was carried out at 90° C. for two hours. The yield was 91% of a polymer of intrinsic viscosity 0.11 and having a chlorine content of 42.0% by weight. This corresponds to a ratio of $n_2$ to $n_1+n_2$ of 0.11.

Example 22

In the apparatus of Example 1, 5 grams of 2,6-dichlorophenol, 5 grams of 2,6-dimethylphenol, 0.5 gram of cuprous bromide, 3 grams of N,N,N',N'-tetramethyl-1,3-butanediamine, and 50 grams of anhydrous magnesium sulfate were dispersed in 600 ml. of chlorobenzene. The temperature of the mixture was raised from 24° C. to 70° C., while oxygen was passed through for one hour. The mixture was worked up as described in Example 1. The yield was 6.4 grams of a copolymer having an intrinsic viscosity (in chloroform at 30° C.) of 0.09 dl. per gram and a chlorine content of 14.2% by weight.

Example 23

Similarly to Example 22, 16 grams of 2,6-dimethylphenol, 3.5 grams of 2,6-dichlorophenol, 0.5 gram of cuprous chloride, 5 grams of diethylamine, and 50 grams of anhydrous magnesium sulfate were dispersed in 250 ml. of chlorobenzene. Oxygen gas was passed through the vigorously stirred mixture. The reaction temperature was maintained at about 35° C. for one-half hour and then at about 80° C. for one and one-half hours. The reaction mixture was filtered and the product isolated similarly to Example 1. The yield was 15.5 grams of a copolymer having an intrinsic viscosity of 0.41 (in chloroform at 30° C.) and a chlorine content of 5.8% by weight.

Example 24

Two grams of a poly-(2,6-dichlorophenylene) ether having an intrinsic viscosity of 0.06 dl. per gram were intimately mixed with 25 grams of a poly-(2,6-dimethylphenylene) ether having an intrinsic viscosity of 0.49 dl. per gram (prepared by the method of Hay as disclosed in the above noted U.S. Patent No. 3,306,875). The mixture was placed in a capillary melt viscometer at 600° F. and its melt viscosity determined over a period of thirty minutes. Subsequently, the melt viscosity of the poly-(2,6-dimethylphenylene) ether itself was determined in the same instrument. The results were as follows:

TABLE 1

| Time at 600° F. (min.) | Melt Viscosity (poises) | |
|---|---|---|
| | Straight polymer | Polymer blend |
| 5 | 27,000 | 12,800 |
| 10 | 22,400 | 21,350 |
| 15 | 23,950 | 22,800 |
| 20 | 24,050 | 23,800 |
| 25 | 25,200 | 24,600 |
| 30 | 24,300 | 25,400 |

This interesting temporary plasticizing action when using the poly-(2,6-dichlorophenylene) ether as a plasticizer in heat-forming operations avoids the detrimental effects usually caused by plasticizers with respect to reduction in tensile strength and tensile modulus resulting from reduced viscosity. This unusual effect apparently results from a chemical interaction between the two polymers. To demonstrate this, the melt-blended material recovered from the melt viscometer was dissolved in benzene and separated into three fractions by incremental addition of methanol. The same method was applied to the original powder blend. The fractions were dried and weighed and analyzed for chlorine content, with the results shown in Table 2 below:

TABLE 2

| Fraction No. | Melt blend | | Powder blend | |
|---|---|---|---|---|
| | Weight (grams) | Chlorine content, percent | Weight (grams) | Chlorine content, percent |
| I | 0.4 | 11.6 | 2.4 | 1.3 |
| II | 1.26 | 1.0 | 0.4 | 6.2 |
| III | 2.2 | 1.3 | 1.7 | 3.7 |

Evidently, a strong shift of the chlorine-containing polymer toward the less soluble fraction has taken place, indicating some chemical interaction resulting in a block or segmental copolymer. In the powder mixture, most of the chlorine-containing polymer is found in the more soluble fractions.

Example 25

Five grams of a poly-(2,6-dichlorophenylene) ether having an intrinsic viscosity of 0.06 dl. per gram and 25 grams of poly-(2,6-dimethylphenylene) ether of intrinsic viscosity of 0.74 dl. per gram were dissolved in 500 ml. of diphenyl ether and the solution refluxed with stirring during one and one-fourth hours. To the solution was then added 200 ml. of methanol. The resulting precipitate was filtered off, redissolved in 500 ml. of chloroform, reprecipitated in 200 ml. of methanol, washed with methanol, and then dried. A portion of this material was fractionated with the results shown in Table 3 below:

TABLE 3

| Fraction No. | Weight (grams) | Chlorine percent |
|---|---|---|
| I | 1.8 | 5.5 |
| II | 1.0 | 6.7 |
| III | 0.64 | 6.4 |
| IV | 0.4 | 2.4 |

The relatively slight variation in chlorine content of the various fractions, except for the small final fraction, indicates that the two polymer species have interacted to apparently yield, as a homogeneous product, a block or segmental copolymer.

Because of their excellent physical, mechanical, chemical, electrical and thermal properties, the polymers and copolymers of this invention have many and varied uses. Notably, these materials have excellent flame resistance and may, therefore, be used in areas where fire hazards exist. In addition, they may be used as flame-proofing additives to otherwise less flame-resistant polymers. The lower molecular weight species may, at the same time, act as stable, nonvolatile plasticizers in these applications. Of particular interest is the addition of halogen-substituted polyphenylene ethers to other polyphenylene ethers, such as poly-(2,6-dimethylphenylene) ethers, because not only does a compound of increased flame resistance result, but the halogen-substituted phenylene ethers in this case exhibit a unique temporary plasticizing action, thus greatly facilitating shaping operations, such as compression or injection molding, without affecting the physical properties of the final product. They may be combined or formulated with other polymeric materials, typical examples of which include: polyesters, polyamides, polyisocyanates, polyalkylene ethers, polyethylenes, polypropylenes, polyacrylates and other polyvinyls, polybutadienes, phenolic resins, triazine resins, epoxy resins, etc. Polyhalophenylene ethers, prepared according to my invention, have been found to be especially valuable as plasticizers conferring flame resistance in polycarbonate compositions including those prepared from bisphenols and phosgene or related carbonic acid derivatives.

The copolymers have the same advantageous properties as the homopolymers and will have good to excellent flame resistant properties if at least 5% chlorine, 2½% bromine, 2% iodine, or a proportionate mixture of two or more of these halogens is present. The major advantage of the copolymers lies in their higher molecular weight and relatively smaller number of branching ortho linkages which greatly increase the consequent beneficial physical properties, including flexibility, impact, strength, etc. The most attractive and desirable copolymers of this invention have been found to be those comprising in combination 2,6-dimethyl(phenylene) oxy units and 2,6-dichloro(phenylene) oxy units. When the flameproofing properties of such a copolymer are desirable, it should then contain no less than 8.7 percent 2,6-dichloro(phenylene) oxy units in order to contain the desired 5% minimum chlorine to impart high flame resistance. However, if flame resistance is no object, copolymers with less chlorine-containing units may be used for their particular combination of physical properties.

The polymers and copolymers of this invention have a particularly interesting combination of properties which make them attractive materials in electrical applications or for use under extreme conditions of pressure, temperature, humidity, and corrosiveness. They have excellent resistance to oxidative and hydrolytic conditions, including heat, steam, acids, alkalies, and other reactive chemicals, together with good physical properties, such as high heat distortion temperature, high tensile strength, high tensile modulus, and excellent impact resistance. They are true thermoplastic materials and may be extruded, molded, cast, or shaped by any other method so as to form various articles and stock materials including: sheets, films, tapes, strands, ribbons, rods, tubing, pipe, laminates, coated products, etc. Coatings upon any convenient substrate may be formed by extrusion, calendering, casting, spraying, etc., as well as by deposition from solution in a volatile solvent or from aqueous dispersions. Further, the materials may be utilized as such or in combination with inert fillers, modifying agents, etc., such as dyes, pigments, stabilizers, plasticizers, and other materials commonly employed with thermoplastic polymers.

The polymers and copolymers as described in this invention otherwise provide the many attractive advantages now available in the prior art polyphenylene ethers while, at the same time, offering the highly significant economic advantage of preparation from relatively inexpensive raw materials.

While specific embodiments of the invention have been shown and described, other modifications and variations are possible in view of the above teachings. It is therefore to be understood that any such changes or improvements are within the spirit and scope of this invention as defined by the appended claims.

What I claim is:

1. A process of preparing a poly-(2,6-dihalophenylene) ether having an intrinsic viscosity of at least 0.09 deciliter per gram as measured in chloroform at 30° C. which comprises the reaction in solution of:

(a) a halophenol having the structural formula

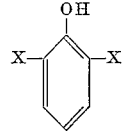

where each X is selected from the group consisting of odine, bromine and chlorine; in the presence of (b) oxygen, and (c) a catalytically active complex of a cuprophilic, strongly chelating amine which does not form stable complexes with copper ions and a basic cupric salt; said reaction being performed at a temperature not greater than 120° C.

2. The process of claim 1 where the amine has a $pK_{ACID}$ value of at least 6.0.

3. The process of claim 1 where the temperature varies between 60° and 85°.

4. The process of claim 1 where the phenol is 2,6-dichlorophenol.

5. The process of claim 1 further comprising a second phenol in an amount up to 99 mole percent of the total, said second phenol having the structural formula

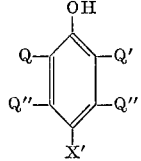

where Q is selected from the group consisting of hydrogen hydrocarbon radicals free of a tertiary α-carbon atom, halohydrocarbon radicals having at least two carbon atoms between the halogen atom and phenol nucleus and being free of a tertiary α-carbon atom, hydrocarbonoxy radicals free of an aliphatic tertiary α-carbon atom, and halohydrocarbonoxy radicals having at least two carbon atoms between the halogen atom and phenol nucleus and being free of an aliphatic tertiary α-carbon atom; Q' and each Q" are the same as Q and, in addition, halogen; and X' is selected from the group consisting of hydrogen, iodine, bromine, and chlorine.

6. The process of claim 5 where the second phenol is 2,6-dimethylphenol.

7. The process of claim 6 where the amine is selected from the group consisting of strongly coordinating, potentially unstable aliphatic polyamines and strongly coordinating, secondary and tertiary unidentate aliphatic monoamines.

8. The process of claim 5 where the reaction is carried out in two stages comprising a first stage performed at the optimum polymerization temperature of the second phenol and a second stage performed at the optimum polymerization temperature of the halophenol.

References Cited

UNITED STATES PATENTS

| | | | |
|---|---|---|---|
| 3,234,183 | 2/1966 | Hay | 260—47 |
| 3,257,357 | 6/1966 | Stamatoff | 260—47 |
| 3,257,358 | 6/1966 | Stamatoff | 260—47 |

WILLIAM H. SHORT, *Primary Examiner.*

M. GOLDSTEIN, *Assistant Examiner.*

U.S. Cl. X.R.

260—33.2, 33.8, 823, 830, 857, 858, 860, 887, 897